United States Patent
Sayrac et al.

(10) Patent No.: US 7,493,246 B2
(45) Date of Patent: Feb. 17, 2009

(54) DEVICE AND METHOD OF CALIBRATION FOR A MODELLING TOOL AND MODELLING TOOL INCORPORATING SUCH A DEVICE

(75) Inventors: Berna Sayrac, Paris (FR); Benoît Fourestie, Paris (FR); Sylvain Renou, Asnieres (FR)

(73) Assignee: France Telecom, Paris (FR)

( * ) Notice: Subject to any disclaimer, the term of this patent is extended or adjusted under 35 U.S.C. 154(b) by 361 days.

(21) Appl. No.: 11/187,743

(22) Filed: Jul. 22, 2005

(65) Prior Publication Data

US 2006/0167671 A1 Jul. 27, 2006

(30) Foreign Application Priority Data

Jul. 22, 2004 (EP) .................................. 04291864

(51) Int. Cl.
*G06F 17/50* (2006.01)
(52) U.S. Cl. ............................... 703/13; 703/2; 703/11; 703/6
(58) Field of Classification Search .................... 703/13, 703/2, 6, 11; 378/4, 37; 714/704; 600/304; 704/250; 601/41; 702/19; 706/10, 15; 73/659; 700/121; 713/401; 219/121.62; 379/112.01
See application file for complete search history.

(56) References Cited

U.S. PATENT DOCUMENTS

| | | | | |
|---|---|---|---|---|
| 6,779,404 | B1* | 8/2004 | Brincker et al. ............... | 73/659 |
| 6,996,476 | B2* | 2/2006 | Najarian ...................... | 702/19 |
| 2001/0044915 | A1* | 11/2001 | Vandersteen et al. ........ | 714/704 |
| 2002/0193670 | A1* | 12/2002 | Garfield et al. ............. | 600/304 |
| 2002/0193711 | A1* | 12/2002 | Halperin et al. ............... | 601/41 |
| 2003/0046041 | A1* | 3/2003 | Copel ........................... | 703/2 |
| 2004/0181375 | A1* | 9/2004 | Sze et al. ....................... | 703/2 |
| 2004/0202280 | A1* | 10/2004 | Besson ........................ | 378/37 |
| 2004/0225498 | A1* | 11/2004 | Rifkin ........................ | 704/250 |
| 2004/0243529 | A1* | 12/2004 | Stoneman ..................... | 706/10 |
| 2006/0013353 | A1* | 1/2006 | Hein ............................. | 378/4 |
| 2006/0089824 | A1* | 4/2006 | Siekmeier et al. ............. | 703/11 |

* cited by examiner

*Primary Examiner*—Paul L Rodriguez
*Assistant Examiner*—Kandasamy Thangavelu
(74) *Attorney, Agent, or Firm*—Drinker Biddle & Reath LLP

(57) ABSTRACT

This calibration device for a tool for modelling a system, on the basis of an observation of the outputs of the system, comprises means of processing the output data emanating from a device for simulating the system, adapted to acquire in a prior learning phase modifications to be made to the output data to match corresponding measurement data, and to modify the output data in accordance with the modifications acquired. It further comprises means of decomposition for carrying out a decomposition of the output data and of the measurement data into independent components, the processing means providing for a processing of the data emanating from the decomposition means. The invention finds application to the modelling of the trajectories of orbiting satellites or the modelling of mobile telephone networks.

13 Claims, 3 Drawing Sheets

DEVICE AND METHOD OF CALIBRATION FOR A MODELLING TOOL AND MODELLING TOOL INCORPORATING SUCH A DEVICE

RELATED APPLICATION(S)

This application claims the priority of European Patent Application No.: EP 04291864.9, filed 22 Jul. 2004, in the name of France Telecom.

BACKGROUND OF THE INVENTION

The invention relates to the modelling of complex systems by means of a modelling tool and pertains, more particularly, to the calibration of such a modelling tool.

The expression "complex systems" is understood, within the framework of the present description, to mean any system or set of systems with unknown transfer function and for which one is interested in the outputs produced as a function of input parameters.

Particularly interesting applications of a device and of a method of calibration in accordance with the invention relate to the modelling of transport networks, telecommunication networks, . . . and, in particular the modelling of the trajectory of an orbiting satellite and the modelling of a telecommunication network. However, the invention applies, in a general manner, to all types of areas in which observations of the output of a complex system are available.

The modelling of such systems consists essentially in simulating their behaviour on the basis of observations of the outputs obtained for given configurations of input parameters, so as to predict the outputs produced by the system.

In the state of the art, various techniques may be used to model complex systems.

A first technique is based on a priori knowledge of the system and consists in combining various mathematical models each representing a physical and concrete phenomenon brought into play in the system. The overall model, which consists of the combination of these models, is then used to compute the outputs of the system as a function of chosen input parameters.

This modelling technique is by nature imperfect in so far as the mathematical models constitute only an approximation to the phenomena brought into play. Neither does this technique make it possible to easily integrate observations of the outputs of the system so as to adapt the overall model accordingly so that the observed outputs are made to match the predicted outputs.

Another known technique consists in using observed outputs to tailor the parameters of an automatic learning system of the "neural network" type. This technique consists in formulating a transfer function on the basis of an observation of the outputs for predetermined input parameters.

This technique is also limited. Specifically, it does not make it possible to use known mathematical models, in so far as the transfer function acts as a simple mathematical operator. Furthermore, the data presented are often dependent on one another and the learning with regard to dependent data often gives rise to an instability of the model.

Such is the case in particular in mobile telecommunication networks when seeking to model the behaviour of the network on the basis of the power and the interference of the stations which constitute correlated parameters.

In view of the foregoing, a first object of the invention is to provide a device for calibrating a modelling tool making it possible to alleviate these drawbacks.

Another object of the invention is to allow the modelling of a system on the basis, on one hand, of a priori knowledge of the phenomena brought into play and, on the other hand, of a posteriori knowledge of these phenomena, as obtained by observing the outputs of the system.

SUMMARY OF THE INVENTION

The invention therefore proposes, according to a first aspect, a calibration device for a tool for modelling a system, on the basis of an observation of the outputs of the system, comprising means of processing the output data emanating from a device for simulating the system, which means are adapted to acquire in a prior learning phase modifications to be made to the output data to match corresponding measurement data, and to modify the output data in accordance with the modifications acquired.

This device further comprises means of decomposition for carrying out a decomposition of the output data and of the measurement data into independent components, whereby the processing means provide for a processing of the data emanating from the decomposition means.

By virtue of the decomposition of the measurements and of the predictions provided by the modelling tool into independent components, it is possible to combine the use of a modelling tool using a priori knowledge of the system, such as mathematical models each representing a physical phenomenon brought into play, and a learning module using a posteriori knowledge of the system as obtained by observing the outputs and which makes it possible to compute a transfer function between the independent components predicted by the modelling tool and the independent components measured on the basis of the outputs of the system.

According to another feature of the invention, the device further comprises means of inverse decomposition able to carry out an inverse decomposition of the data emanating from the processing means.

For example, the decomposition means comprise means of independent component analysis (ICA).

In one embodiment, the processing means comprise a neural network.

According to another feature of the invention, the device comprises means for formulating densities of the data emanating from the decomposition means serving to carry out a decomposition of the outputs of the modelling tool and of the measurement data into independent components, the processing means providing for a processing of the data emanating from the means for formulating statistical densities.

For example, the means for formulating the statistical densities consist of sampling means.

According to another aspect, the invention proposes a tool for modelling a complex system, comprising a device for simulating the system so as to predict the outputs of the system for given inputs, and a calibration device as defined above.

According to a third aspect, the invention proposes a method of calibration for a tool for modelling a system on the basis of an observation of the outputs of the system, comprising a processing of the data emanating from the modelling tool so as to modify the outputs of the said tool on the basis of a prior learning in which modifications to be made to the outputs of the tool to match corresponding measurement data are acquired. Prior to the processing step, the outputs of the modelling tool and of the measurement data emanating from the tool are decomposed into independent components.

In one embodiment, subsequent to the data processing step, an inverse decomposition of the processed data is performed. For example, an independent component analysis (ICA) procedure is implemented.

For example, the processing step is implemented by means of a neural network.

In a preferred embodiment, the method steps are executed by a computer under the control of program instructions. Consequently, subject matter of the invention is also a computer program intended to be stored in or transmitted by a data medium comprising program instructions for executing the method by a computer. The data medium may be a hardware storage medium, for example a CD-ROM, a magnetic diskette or a hard disk, or else a transmissible medium such as an electrical, optical or radio signal.

DESCRIPTION OF PREFERRED EMBODIMENTS

Figure 1:
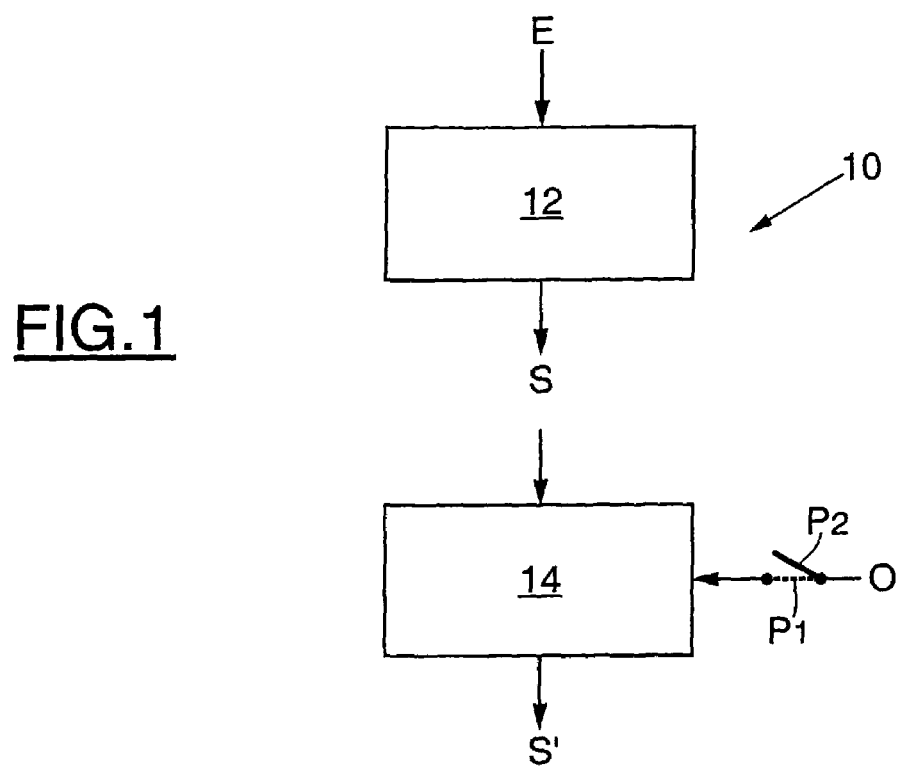
FIG. 1 is a schematic diagram illustrating the general architecture of a modelling tool in accordance with the invention.

Represented in FIG. 1 is the general architecture of a tool for modelling a complex system in accordance with the invention, designated by the general numerical reference 10.

This tool is intended to constitute a modelling of a complex system, such as a telecommunication network or the trajectory of an orbiting satellite, so as to predict the output or outputs of the system for given inputs.

Thus, for example, within the framework of the modelling of the trajectory of a satellite, the outputs delivered by the tool 10 are constituted by the three coordinates of the satellite in a polar reference frame tied to the earth.

In the case of the modelling of a mobile telephone network, the outputs may be constituted by: the total power emitted by each base station; the total interference received by each station; the number of communications that are cut off; the number of communications that are not allowed; the number of communications of poor quality; the mean bit rate for each packet mode service; etc. In this case, the inputs E may be constituted by the number of mobiles for each service in each station; the number of mobiles in macro-diversity mode; the signal-to-noise ratio necessary to obtain a communication of good quality as a function of the service; the antenna settings and maximum power settings of the stations; the power of the shared or signalling channels; the maximum powers allocated per traffic channel and per service; the target loadings of the stations, etc.

As may be seen in FIG. 1, the tool 10 comprises two stages, namely a first stage 12 constituting a device for simulating the system serving to predict the outputs of the system for given inputs, and a calibration device 14 for calibrating the outputs S delivered by the simulation device 12 so as to take account of the observations O of the outputs of the system.

The simulation device 12 may consist of various types of simulators of classical type based on the a priori knowledge of the phenomena brought into play. It will thus be possible to use a simulator using various combined mathematical models each simulating a phenomenon brought into play within the system.

For example, for the simulation of a network of mobiles, it will be possible to use various types of models, such as a propagation model, a traffic model, a model of the movement of the mobiles, etc.

Reference may also be made to the article entitled "UMTS EASYCOPE: A Tool for UMTS Network and Algorithm Evaluation", Seminar on Brandboard Communications, Zurich, 2002, by J. Maucher, G. Kunz, and A. Rinkel, or to the article entitled "Advanced WCDMA Radio Network Simulator", IEEE International Symposium on Personal, Indoor and Mobile Radioconference, Osaka, Japan, pages 951-955 12-15 Sep. 1999, by Seppo Hämäläinen, Harri Holma and Kari Sipilä, which describe various types of simulation devices for modelling a telecommunication network of mobile type.

The calibration device 14 receives, as input, the outputs S of the simulation device and modifies these outputs so as to formulate outputs S' corresponding as closely as possible to reality.

This calibration is based on the observation of outputs O of the system, additionally measured, and consists in modifying the predictions S delivered by the simulation device 12 so as to make these predictions match the observations of the outputs of the system (phase P1).

On completion of this phase P1, the predicted outputs are calibrated by modifying them according to the modifications determined during this phase P1 (Phase P2).

The simulation device and the calibration device each consist of a computer integrating all the hardware and software means making it possible to model and calibrate a complex system. They may also consist of respective computation stages of one and the same duly programmed computer.

Figure 2:
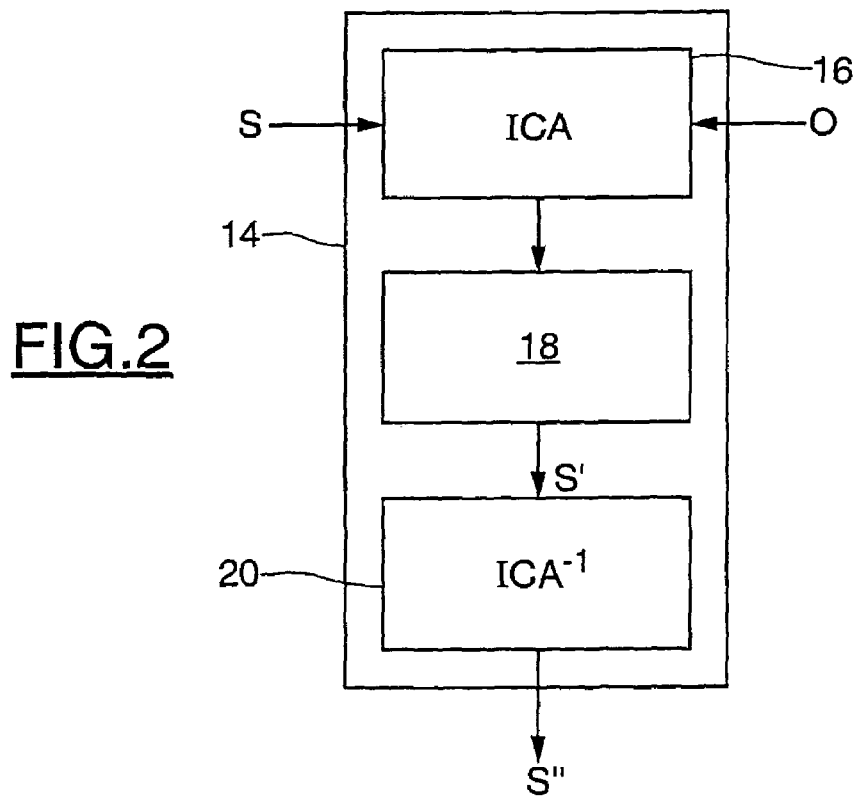
FIG. 2 is a schematic diagram illustrating the makeup of the calibration device entering into the makeup of the modelling tool of FIG. 1.
Figure 3:
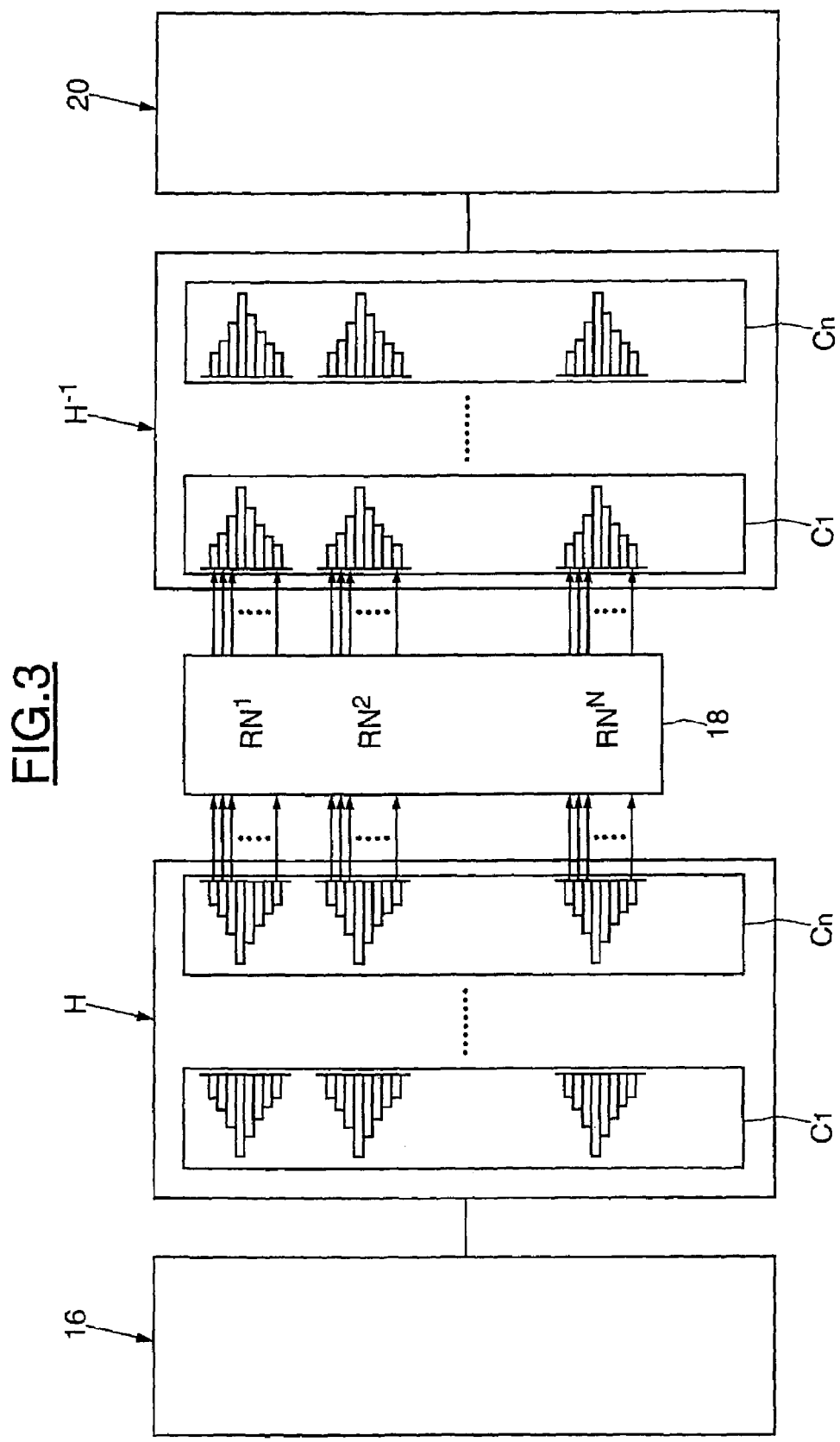
FIG. 3 is another schematic diagram illustrating the manner of operation of the calibration device in accordance with the invention.

In the exemplary embodiment illustrated in FIGS. 2 and 3, the calibration device comprises a first stage 16 receiving, as input, the predictions S emanating from the modelling device 12 and, during phase P1, the observations O. This stage comprises processing means able to decompose the predictions S and the observations O into independent components. Thus, at the output of this first module 16, the mutually independent original signals are extracted from the predictions formulated by the simulation device 12.

For example, this first stage 16 consists of a module for independent component analysis ICA. Such an ICA procedure is a procedure well known to the person skilled in the art. It will therefore not be described in detail hereinbelow. It will be possible, in this regard, to refer to the document entitled "Independent Component Analysis, A New Concept", by P. Comon, Signal Processing, vol. 36, No 3, pages 287-314, April 1994 (Elsevier) or to the document entitled "Independent Component Analysis: A Tutorial" by Aapo Hyvärinen and Perkki Oja, Helsinki University of Technology; Laboratory of Computer Information Science, P.O. Box 5400, Finland.

It will be noted nevertheless that the ICA procedure is based on the observation of a mixture of signals so as to access the independent signals and rests on an assumption according to which the independent components have non-Gaussian distributions. It essentially involves performing a linear transformation of the mixture of observed signals so as to minimize the statistical dependence between each of the components. This independence is obtained by reasoning iteratively with regard to the statistical moments, and the analysis may be stopped for an order deemed sufficient. Such a transformation is performed, on the one hand, on the data emanating from the modelling device and, on the other hand, on the observed data, so that the same transformation is applied to the output data and to the observed data.

The calibration device further comprises a second stage 18 serving to formulate calibrated predictions S'.

For example, this second stage 18 consists of a neural network serving to apply a transformation to the decomposed predictions so as to make them match as well as possible the actual output components of the modelled system.

As is known, a neural network is arranged in the form of layers each constituting a processing module. These layers are linked together by linking elements which extend between the neurons of each layer according to a specific configuration formulated during a prior learning phase in the course of which these linking elements are configured so as to make the outputs of the first stage 16 match the observations O.

A third stage 20 carries out an inverse decomposition $ICA^{-1}$ so as to perform a recombination of the decomposed signals emanating from the neural network 18. The construction of this third stage 20 is similar to that of the first stage 16 and will therefore not be detailed further.

As may be seen in FIG. 3, the processing performed by the neural network 18 is performed in parallel on each independent component C1, . . . CN, of the predictions emanating from the modelling device 12. Likewise, the inverse decomposition performed by the third stage 20 is performed in parallel on each of the components C1, . . . CN emanating from the neural network 18 so as to formulate, as output, a signal S' in which the components are again correlated.

As may be seen likewise in FIG. 3, the calibration performed is carried out on the basis of the statistical distributions of the predictions provided by the simulation device 12. Specifically, direct learning performed by a neural network on values and not on their distribution leads to rather unreliable or overly complex results.

The term "distribution" is understood to mean the spread of the predicted variable. Such a distribution can be obtained by a conventional sampling device H. For example, H may be the computation of the histogram of the predicted variable. $H^{-1}$ denotes the operation inverse to H, i.e. the drawing of the variable predicted according to the distribution of the variable. Thus, the calibration device incorporates a sampler capable of computing the distribution of the predictions delivered by the device 12. For example, this sampler is integrated into the first stage 16 implementing the independent component analysis procedure. It may also consist of a specific module interposed between the first and second stages 16 and 18 of the calibration device, as represented in FIG. 3.

Figure 4:
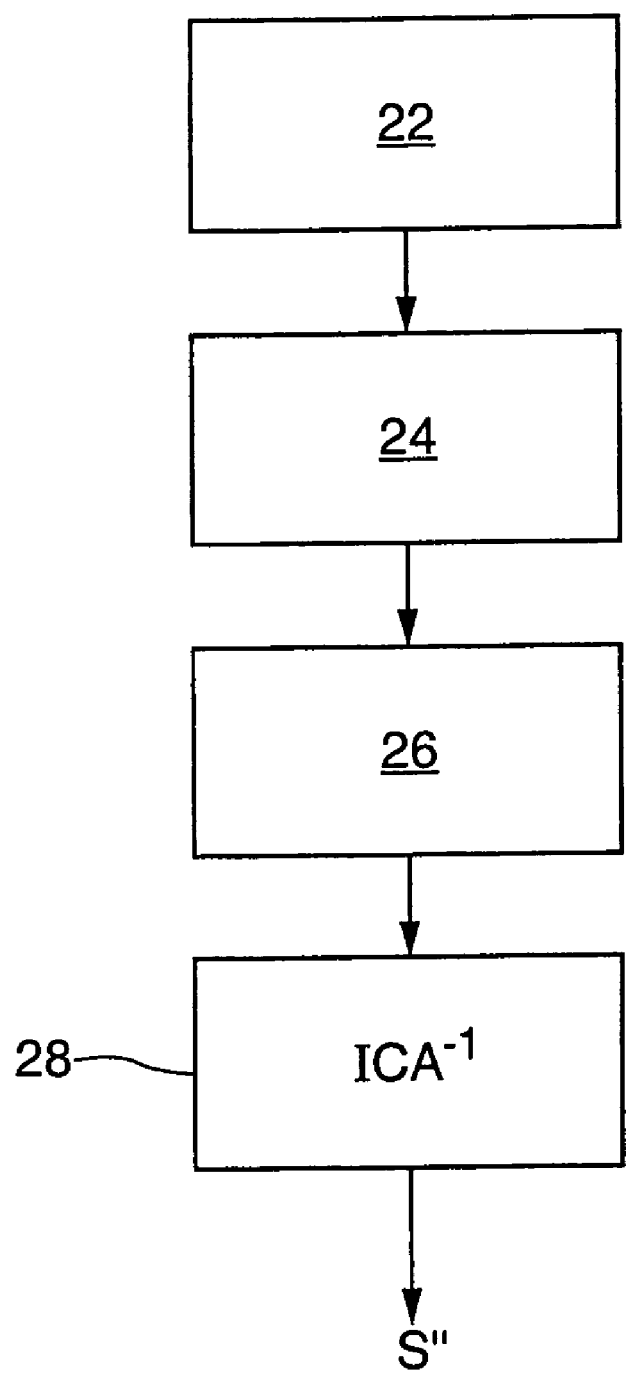
FIG. 4 is a flowchart illustrating the main phases of the method of calibrating a modelling tool in accordance with the invention.

Referring finally to FIG. 4, the calibration of a tool for modelling a complex system comprises a first phase 22 in the course of which the predictions emanating from the modelling device 12 are retrieved.

In the course of the next step 24, an independent component analysis procedure ICA is implemented so as to decompose the predictions into independent components. In the course of this step, a sampling of the predictions is also performed so as to perform the subsequent computations on the basis of the distributions of these data and not on the values themselves.

The neural network 18 is then implemented (step 26) so as to modify the components predicted as a function of the results of the prior learning in the course of which the network is configured so as to make the predicted output components match the observed output components.

During the next step 28, an inverse decomposition of the predictions thus processed is performed so as to recorrelate the calibrated independent components and obtain, as output, calibrated predictions S'.

As indicated previously, the prior decomposition of the measurements and of the outputs of the simulator into independent components makes it possible to implement a processing using a neural network and therefore to combine with a modelling device, based on a priori knowledge of the system, an additional processing based on measurements, and hence on a posteriori knowledge and to do so without requiring any processing of unmanageable complexity. Specifically, by decomposing the outputs and the measurements into independent components, it is possible to carry out learning on the distributions and to do so separately, that is to say without considering the joint distributions.

Additionally, by virtue of the use of this prior decomposition, and in particular the independent component analysis procedure ICA, it is possible to simplify the investigation space. Specifically, during the independent component decomposition, it is possible to choose to retain only the most significant components. It is thus possible to decrease the number of variables used.

The invention claimed is:

1. A modeling system for modeling a complex system, comprising:
one or more processors; and
a memory storing a program of instructions for a modeling tool, the modeling tool comprising:
a simulator device for simulating the complex system, the simulator device comprising an input for entering given inputs and an output at which prediction values of the complex system are provided, the simulator device simulating the complex system; and
a calibration device, comprising
a prediction input that receives prediction values from the prediction output of the simulator device;
an observation input that receives measurement data obtained from observation of outputs of the complex system to be simulated;
a decomposition mechanism for carrying out a decomposition of the received prediction values into prediction independent components, and a decomposition of the measurement data into measured independent components, the decomposition mechanism having an output at which the prediction independent components and the measured independent components are provided;
second stage processor logic comprising an input, the input receiving the prediction independent components and the measured independent components from the decomposition mechanism, the processor logic comprising logic to:
determine, in a prior learning phase, modifications to be made to the received prediction independent components to match the corresponding measured independent components; and
modify the received prediction independent components in accordance with the determined modifications to produce calibrated predicted independent components,
the second stage processor logic further comprising an output at which a signal related to the calibrated predicted independent components is provided to the modeling tool user.

2. The calibration device according to claim 1, wherein the calibration device utilizes statistical distributions of the received prediction values.

3. The calibration device according to claim 1, further comprising an inverse decomposition mechanism having an input for receiving the calibrated predicted independent components from the second stage processor logic output, processing logic for carrying out an inverse decomposition of the calibrated predicted independent components, and an output at which the inverse decomposed data is provided to a user.

4. The calibration device according to claim 1, wherein the decomposition mechanism comprises an independent component analysis (ICA) algorithum.

5. The calibration device according to claim 1, wherein the second stage processor logic comprises a neural network.

6. The calibration device according to claim 1, further comprising an algorithm for formulating statistical densities of data obtained from the decomposition mechanism output, and providing the formulated statistical densities to the second stage processor logic input.

7. The calibration device according to claim 6, wherein the algorithm for formulating statistical densities comprises a sampler.

8. A method for modeling a complex system comprising:
   in a learning phase:
   (a) simulating the complex system for given inputs to provide a prediction output, based on an a priori knowledge of the system, so as to obtain prediction values;
   (b) measuring, at an output of the system, measurement values;
   (c) decomposing the prediction values into prediction independent components, and the measurement values into measurement independent components; and
   (d) determining calibration modifications to make the predicted independent components substantially match the measured independent components; and
   in a correction phase:
   (e) receiving prediction values from the prediction output generated by simulating the complex system for given inputs;
   (f) decomposing the received prediction values into prediction independent components for the correction phase;
   (g) modifying the decomposed prediction independent components for the correction phase in accordance with the determined calibration modifications to produce calibrated predicted independent components;
   (h) outputting, to a modeling tool user, a signal related to the calibrated predicted independent components.

9. The method according to claim 8, further comprising the step of:
   performing an inverse decomposition of the calibrated predicted independent components.

10. The method according to claim 8, wherein the modifying step is implemented with a neural network.

11. The method according to claim 8, wherein the decomposing step comprises an independent component analysis (ICA) procedure.

12. A computer readable medium that stores program instructions for a computer to execute steps for modeling a complex system, the steps comprising:
    in a learning phase:
    (a) simulating the complex system for given inputs to provide a prediction output, based on an a priori knowledge of the system, so as to obtain prediction values;
    (b) measuring, at an output of the system, measurement values;
    (c) decomposing the prediction values into prediction independent components, and the measurement values into measurement independent components; and
    (d) determining calibration modifications to make the predicted independent components substantially match the measured independent components; and
    in a correction phase:
    (e) receiving prediction values from the prediction output generated by simulating the complex system for given inputs;
    (f) decomposing the received prediction values into prediction independent components for the correction phase;
    (g) modifying the decomposed prediction independent components for the correction phase in accordance with the determined calibration modifications to produce calibrated predicted independent components;
    (h) outputting, to a modeling tool user, a signal related to the calibrated predicted independent components.

13. The medium of claim 12, wherein the program instructions further comprise program instructions for performing an inverse decomposition of the calibrated predicted independent components.

* * * * *